E. J. & E. T. BOEHM.
EGG TESTER.
APPLICATION FILED MAY 26, 1916.

1,197,335.

Patented Sept. 5, 1916.

INVENTORS
E. J. Boehm, & E. T. Boehm
BY
G. H. Albee.
ATTORNEY

UNITED STATES PATENT OFFICE.

EDWARD J. BOEHM AND EMERY T. BOEHM, OF NEENAH, WISCONSIN.

EGG-TESTER.

1,197,335.  Specification of Letters Patent.  Patented Sept. 5, 1916.

Application filed May 26, 1916. Serial No. 100,031.

*To all whom it may concern:*

Be it known that we, EDWARD J. BOEHM and EMERY T. BOEHM, citizens of the United States, and residents of Neenah, in the county of Winnebago and State of Wisconsin, have invented a new and useful Egg-Tester, of which the following is a specification.

Our invention comprises an open topped box for containing the apparatus and relates to the process of testing the age and quality of eggs by means of their arrangement between the eye of the person doing the testing and a lighted lamp, an electric lamp globe for the lamp being shown in the present case, but other lights may be used successfully when occasion requires.

A feature of our invention is the arrangement of an amber colored sheet of glass between the observer and eggs, said color being especially adapted for showing the colors in the eggs when the testing is being carried on during day light, that time being the time when the bulk of the eggs are required to be tested. It is not needed when testing at other times than during day light. Other colors of glass have been tried, but none were found to give such distinct views of the contents of the shell as did the amber color. In using electricity for the light in testing, as a means of its economic use, we arrange an egg holding tray to be slid into the box above the lamp, which upon reaching the inward limit of its movement, engages a switch and makes an electrical connection for lighting the lamp which remains lighted only so long as said electrical connection remains, the instant the tray is withdrawn, the connection is broken and the light extinguished, so that the person using the tester has only to pay for the current for the short time that the eggs are being examined.

Our invention is shown in the accompanying drawing, in which,—

Figure 2:
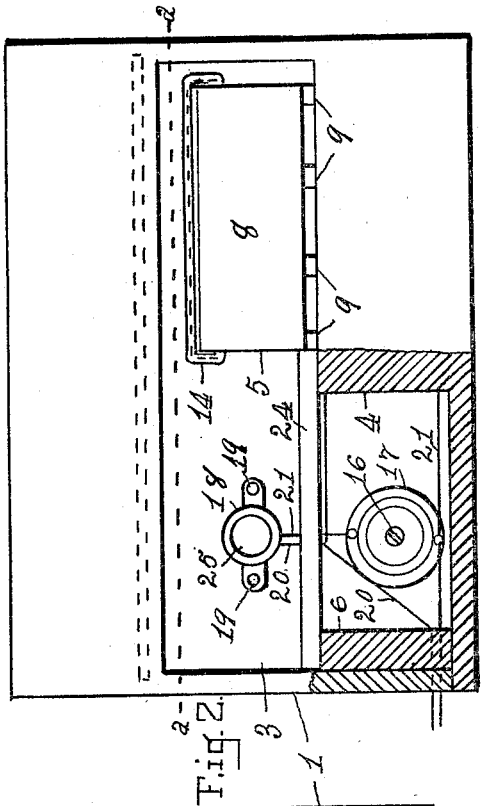
Figure 3:
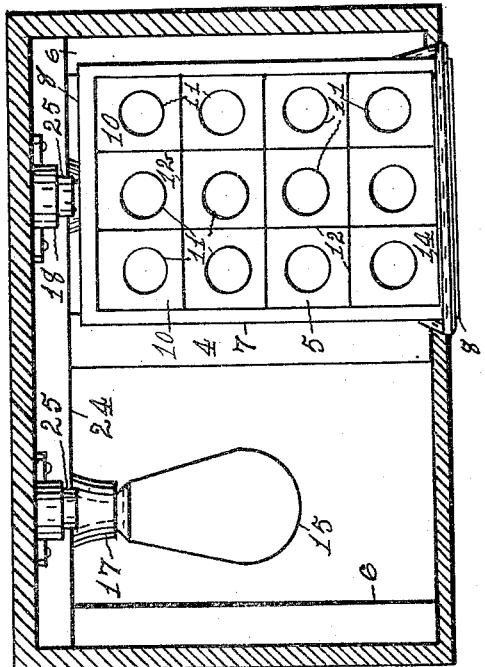
Figure 1:
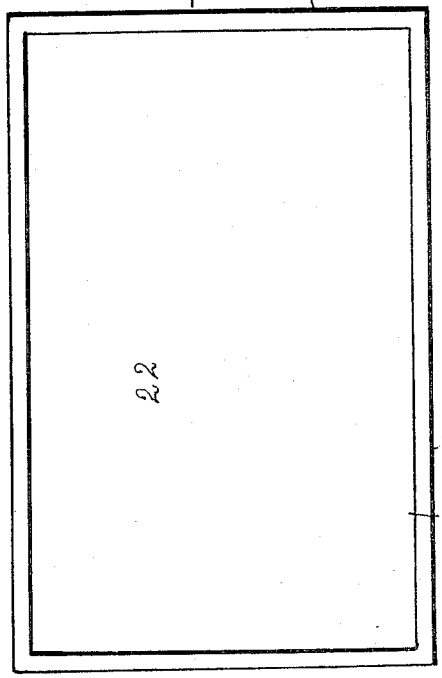
Figure 4:
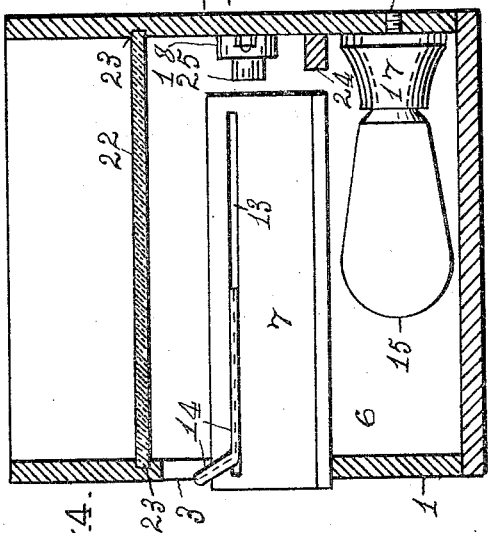

Figure 1 is a top view or plan of the apparatus containing box. Fig. 2 is a side elevation of the front side of the box the lower left hand corner being in section, the lamp removed and showing its socket and switch. Fig. 3 is a plan of the box below the line *a*, *a*, of Fig. 2, and showing an egg tray in position over the right hand half and a lamp in the left hand half. Fig. 4 is a transverse section of the box just inside of the right hand end, an egg tray in position therein and a lamp under the tray.

Similar numerals indicate like parts in the several views.

It may be observed that in practice, we prefer to use an egg tray holding two dozen of eggs and filling the entire length of the opening in Fig. 2, but for illustrating and describing the device, find it better to show a tray holding but one dozen. It should be understood that the open topped box may be of a size to hold trays containing any number of eggs, but one for two dozen is thought to be best suited for the general public.

1, indicates the open topped box; 2, its open top; 3, an opening extending the entire length of the front of the box; 4, a division piece across the lower part of the box; 5, an egg tray having one side resting upon the piece 4; 6, a support for the tray at the end of the box.

The egg tray consists of two side pieces 7, two end pieces 8, four strips 9 secured to the lower edges of the end pieces 8, these being of wood. A bottom of thick pasteboard 10, is laid across the strips 9, having circular apertures 11, for receiving and holding each an egg, and paste-board cross pieces 12, are arranged for separating the eggs. The sides 7, are each provided with a groove 13, in which a wire bail 14, is arranged to slide, it being shown in Figs. 3 and 4, as at one end of the tray, but when slid to the mid length of the tray serves as a bail with which to lift the tray. There is also a shallow paper tray, (not shown,) which may be placed over a tray of eggs after examination, and then inverted, leaving the eggs upon said paper tray. These wood and paper trays were patented by Henry S. Jennie, March 10, 1903, No. 722,512. While they are well adapted for our use, especially the wood tray, they are no part of our invention and any other tray having circular openings in its bottom for holding eggs, may be used successfully. Electric lamps 15, are secured to the rear side of the box by means of screws 16 in each lamp holder 17, and the switch 18, is secured thereto by means of screws 19, wires 20 and 21 being arranged for carrying the required current to the switch and lamps. The colored glass 22, is secured in position above the opening 3, by forming grooves 23, in the box boards, into which grooves the glass is slipped. A stop piece 24, is arranged along the rear side of the box for the egg tray to engage at the limit of its inward movement.

The operation of the device is as follows: Eggs are placed in the tray, one in each aperture 11, and the tray and eggs then inserted into the box through the opening 3, the tray being shoved in until it engages the switch button 25 when the lamp which is connected with that particular switch will be lighted and light up the space below the tray. If any defective eggs are discovered the tray is withdrawn and the defective ones removed, the electric current being cut off the instant the tray is disconnected from the switch button, so that there is no expense for current excepting for the time during which the eggs are being examined.

We are aware that electric lamps have previously been used for testing eggs and that their lamps were lighted by the engagement of the egg tray with the electric switch. We do not therefore claim such a combination broadly; but

We claim:

1. An egg tester, comprising an open topped box, a sheet of amber colored glass arranged horizontally across said box a short distance below the top, an opening through the front side of the box below said glass, means for supporting an egg holding tray at the lower edge of said opening, a tray having a bottom with circular apertures therein adapted to be slid through said opening upon said supports and under said glass, and a light arranged to light up the space below the tray.

2. An egg tester, comprising an open topped box, a sheet of amber colored glass arranged horizontally across said box a short distance below the top, an opening through the front side of the box below said glass, means for supporting an egg holding tray at the lower edge of said opening, a tray having a bottom with circular apertures therein adapted to be slid through said opening upon said supports and under said glass, and an electric lamp arranged below the tray and connections from said lamp to a source of electricity.

3. An egg tester, having in combination an open topped box, a sheet of amber colored glass arranged horizontally across said box a short distance below the top, an opening through the front side of the box below said glass, means for supporting an egg holding tray at the lower edge of said opening, a tray having a bottom with circular egg apertures therein and adapted to be slid through said opening upon said tray support, an electric lamp arranged below said apertured tray, a switch arranged upon the rear side of the box opposite said front opening wires connecting said switch with a source of electricity, said switch being arranged to be engaged by said tray when slid in to its inward limit and to light the lamp and to break the current when the tray is withdrawn from engagement therewith.

EDWARD J. BOEHM.
EMERY T. BOEHM.

Witnesses:
C. M. ALBEE,
KATE W. JONES.